United States Patent [19]
Anton

[11] 3,833,195
[45] Sept. 3, 1974

[54] AIR SURFACE GAUGE STAND
[76] Inventor: Joe Anton, 65-401 80th St., Fresh Meadows, N.Y. 11365
[22] Filed: June 28, 1973
[21] Appl. No.: 374,632

Related U.S. Application Data
[63] Substitute for Ser. No. 237,746, March 24, 1972, abandoned.

[52] U.S. Cl. .................... 248/125, 180/125, 248/23
[51] Int. Cl. ............................................. G01b 3/22
[58] Field of Search ............ 180/125; 248/125, 124, 248/23, 346, 188.2, 188.4, 287, 295, 296

[56] References Cited
UNITED STATES PATENTS

| | | | |
|---|---|---|---|
| 2,940,357 | 6/1960 | Oswold | 248/23 |
| 3,239,024 | 3/1966 | Christian | 180/125 |
| 3,348,421 | 10/1967 | Boice | 248/125 |
| 3,367,612 | 2/1968 | Usiskin | 248/124 |
| 3,424,413 | 1/1969 | Applegate | 248/23 |
| 3,437,168 | 4/1969 | Grassl | 180/125 |
| 3,570,796 | 3/1971 | Capps | 248/125 |

Primary Examiner—Marion Parsons, Jr.
Attorney, Agent, or Firm—Charles E. Temko

[57] ABSTRACT

An air surface gauge stand of a type adapted to support an electronic measuring head or similar device for movement above a horizontal reference surface. The device includes a lower base having hollow feet to which a continuous supply of low pressure compressed air is fed to permit the lower base to be easily slid over the reference surface. An upper base is supported upon said lower base at points directly above the hollow feet in such manner that the upper platform is tiltably adjustable with respect to the lower platform about a substantially horizontal axis. A vertical supporting column extends from said upper base which supports a sliding clamp upon which the measuring instrument is mounted, the tiltable adjustment being employed to provide movement of the instrument relative to the lower base in which the vertical component thereof is extremely fine.

4 Claims, 4 Drawing Figures

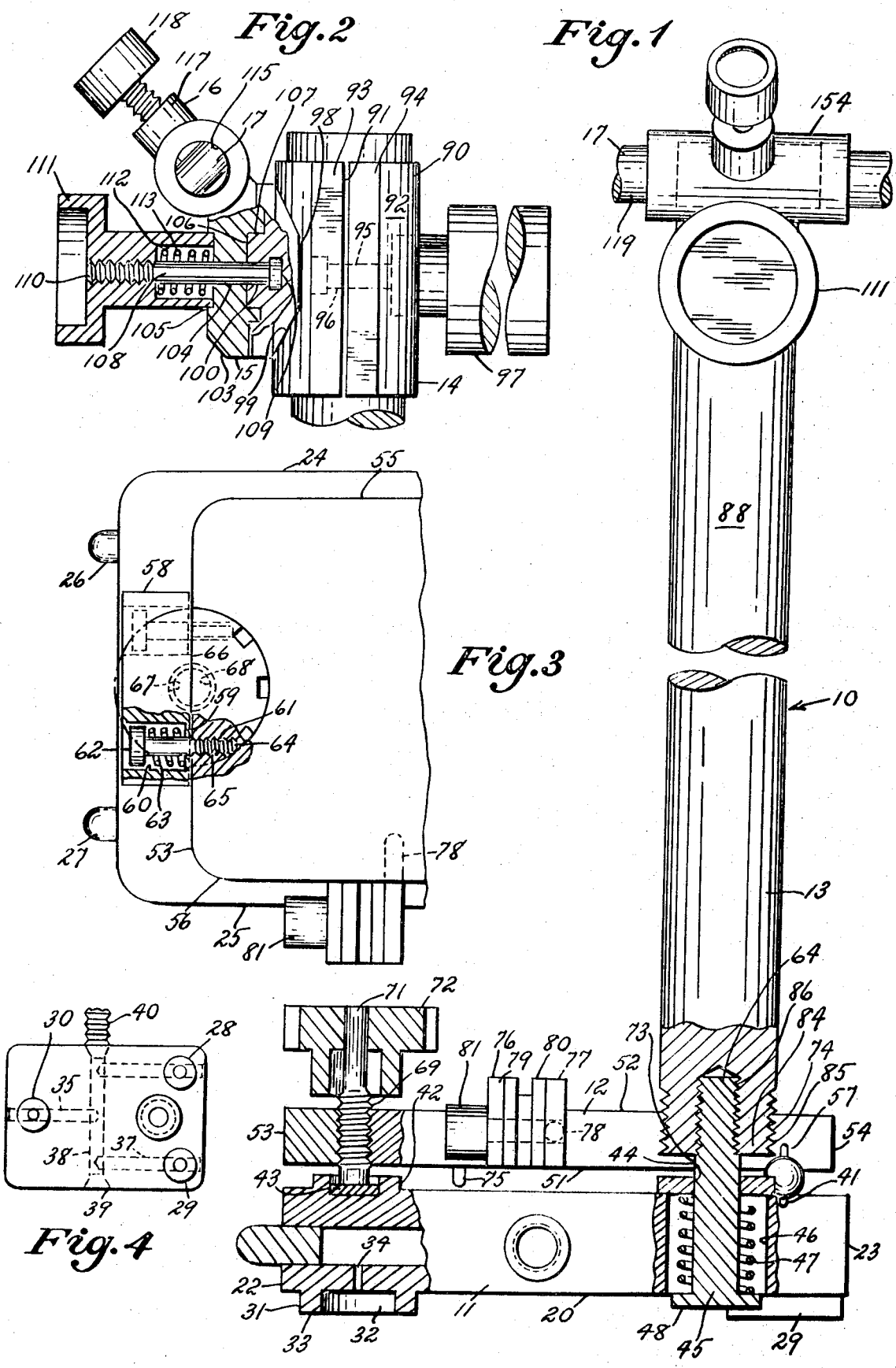

3,833,195

AIR SURFACE GAUGE STAND

This application is a substitute application for Application Ser. No. 237,746 filed Mar. 24, 1972, now abandoned.

This invention relates generally to the field of high accuracy electronic measuring instrumentation, and more particularly to an improved instrument stand adapted to be supported upon a reference surface for movement thereover, whereby heights above the reference surface may be measured and transferred. Devices of this general type are known in the art, and the invention lies in specific constructional details permitting improved accuracy and ease of operation.

BRIEF DESCRIPTION OF THE PRIOR ART

It is known in the art to provide a film of compressed air between an instrument platform and a horizontal reference surface, to permit the platform to be moved over the surface without sticking. In such devices, the air is distributed substantially uniformly over the entire undersurface of the platform, and regrinding of the undersurface which becomes necessary with wear is a relatively difficult operation. Prior art platforms also offer no relative adjustability between the member thereof which contracts the reference surface and the member which supports the measuring instrument, which may be of either electronic or mechanical type.

BRIEF DESCRIPTION OF THE PRESENT INVENTION

Briefly stated, the present invention contemplates the provision of an instrument stand including a lower base which contacts the reference surface by means of a plurality of hollow circularly-shaped feet. Air pressure is supplied to the interior of the feet which results in a flow of air past the feet to prevent sticking. An upper base is supported at three points located directly above the principal axes of the feet, in such manner that the upper base may be pivotally adjusted with respect to the lower base about a horizontal axis passing through the principal axes of two of the feet. A horizontal column is supported by the upward platform, and mounts a slidable clamp supporting in turn structure upon which the instrument is mounted, so that the minor pivotal adjustment of the upper base with respect to the lower base, extremely small increments of vertical displacement with respect to the reference surface may be imparted to the instrument.

BRIEF DESCRIPTION OF THE DRAWINGS

In the drawings, to which reference will be made in the specification, similar reference characters have been employed to designate corresponding parts throughout the several views.

FIG. 1 is a fragmentary side elevational view, partly in section of an embodiment of the invention.

FIG. 2 is a fragmentary side elevational view, partly in section, as seen from the righthand portion of FIG. 1.

FIG. 3 is a fragmentary sectional view, partly broken away to show detail as seen from the plane 3—3 in FIG. 1.

FIG. 4 is a plan view of a lower base element forming a part of the embodiment.

DETAILED DESCRIPTION OF THE DISCLOSED EMBODIMENT

In accordance with the invention, the device, generally indicated by reference character 10, comprises broadly: a lower base element 11, an upper base element 12, a vertical column member 13, a sliding clamp element 14, a rotary clamp element 15, a laterally adjustable clamp element 16 and an instrument supporting rod 17.

The lower base element 11 is of generally rectangular planar configuration, and is preferably formed from close-grained cast iron. It is bounded by a lower surface 20, an upper surface 21, first and second end surfaces 22 and 23, respectively, and first and second side surfaces 24 and 25, respectively. A pair of contact pins 26 and 27 extend from one side surface to serve as vertical reference points, as is known in the art. The element 11 is supported on first, second and third hollow annular supporting fee, 28, 29 and 30, respectively. Each of the feet 28–30 is bounded by an outer cylindrical surface 31, an inner cylindrical surface 32 and a lower circularly shaped machined surface 33. A centrally located bore 34 communicates with one of a plurality of air supply passages 35, 36 and 37, which in turn communicate with a main air supply gallery 38 bounded by a closed end 39 and a pneumatic hose fitting 40.

Indented in the upper surface 21 are a pair of pressed ball seats, one of which is indicated by reference character 41 which overlie the feet 29 and 30, and an annular recess 42 overlying the foot 28 having a hardened seat 43. A vertical bore 44 is penetrated by a threaded shaft 45. A counterbore 46 is axially aligned with the bore 44, and accommodates a coil spring 47 maintained therein by an enlarged base 48 of the shaft 45.

The upper base element 12 is also of planar, generally rectangular configuration, and is slightly smaller in overall size. It is bounded by a lower surface 51, an upper surface 52, end surfaces 53 and 54 and side surfaces 55 and 56. Ball seats, one of which is indicated by reference character 57, are positioned to overlie the seats 41. A resiliently mounted member 58 is positioned opposite the end surface 53 (FIG. 3) and includes a pair of bores 59 and axially aligned counterbores 60 projecting therethrough. Threaded members 61 are provided with enlarged heads 62 to retain coil springs 63 within the counterbores 60. Threaded ends 64 engage correspondingly threaded bores 65 in the element 12. An inner surface 66 includes a half round threaded recess 67 which is positioned opposite a corresponding half round threaded recess 68. A threaded adjusting member 69 is engaged by the threads of the recesses 67 and 68, the lower end thereof bearing upon the seat 43. This construction provides for lash-free operation of the member 69, permitting of extremely fine adjustment, obtained by manually rotating a knurled knob 72 on the upper end 71 of the member 69.

A vertically extending bore 73 communicates with an axially aligned counterbore 74. A fixed pin 75 contacts the upper surface 21 of the element 11 when the device 10 is not in use, and provides a limit for the relative adjustability of the elements 11 and 12.

When the device is used in conjunction with an electronic probe, an electrical conductor will normally extend from the probe to an indicating means, usually in the form of a galvanometer. In order to prevent any vibration in the conductor or the weight of the same from interfering with an accurate reading, it is desirable to immobilize a segment of the conductor adjacent the probe. This is provided for by a clamp member 76 including a fixed wall 77 fixed on the element 13 by a pin 78 and a movable wall 79 between which there are positioned several resilient cushioning members 80. The wall 79 is moved toward the wall 77 by means of a thumb screw 81.

The vertical column member 13 extends upwardly from the element 12, commencing at a lower end 84 having a threaded outer surface 85 engaging the threaded counterbore 74. A threaded bore 86 engages the threaded upper end 64 of the member 61, thereby providing a resilient interconnection between the elements 11 and 12. Extending downwardly from an upper end 87 is a smooth outer surface 88 upon which the clamp element 14 is adjustably positioned.

The element 14 is in the form of a split clamp, and includes a tubular body 90 bounded by an inner surface 91 and an outer surface 92. Extending from the body 90 are a pair of flanges 93 and 94, one of which is provided with a smooth bore 95 and the other with a threaded bore 96 engageable with a thumb screw 97 operation of which serves to lock the body 90 upon the column member. A platform 98 is integrally cast with respect to the tubular body 90, and is provided with a conically-shaped seat 99 axially aligned with a bore 100.

The rotary clamp element 15 is positioned within the above mentioned seat, and includes a bore 104 and counterbore 105. A boss 106 engages a correspondingly shaped circular recess 107. A pin 108 is provided with an enlarged head 109, and includes a threaded segment 110 engageable with an internally threaded thumb screw 111. The thumb screw 111 is provided with a counterbore 112 accommodating a coil spring 113, and from a consideration of FIG. 2, it will be apparent that when the thumb screw is tightened, the annular base 103 is locked in position against rotation.

The element 16 includes a tubular member 154 cast integrally with the element 14, and having a hollow bore 115 therein. A laterally extending threaded sleeve 117 is provided with a set screw 118 which bears upon the surface of an elongated rod 119, a free end (not shown) of which supports the measuring probe.

During operation, the lower base element 11 may be slid over the horizontal reference surface (not shown) and when an approximate adjustment of the probe relative to the column member 13 has been made, a precise height adjustment can be completed by pivotally adjusting the upper base element with respect to the lower base element using the member 69. Pivotal movement about the bearings 122 will result in orbital movement of the probe, the vertical component of which is extremely small, thus facilitating the reaching of a zero setting for the probe.

I wish it to be understood that I do not consider the invention limited to the precise details of structure shown and set forth in this specification, for obvious modifications will occur to those skilled in the art to which the invention pertains.

I claim:

1. An air surface gauge stand construction comprising: a first lower base element of generally planar configuration and having a downwardly facing surface and an upwardly facing surface, a plurality of hollow cylindrical feet extending downwardly from said downwardly facing surface, means for supplying air under pressure to the interior of said feet to continuously escape past the lowermost surfaces thereof; an upper base element of generally planar configuration, and having a downwardly facing surface and an upwardly facing surface, a pair of ball bearing supports overlying two of said hollow feet and projecting upwardly of said lower base element and supporting said upper base element by engaging seats in said downwardly facing surface thereof; and threaded means penetrating said upper base element and bearing upon said lower base element in the area of third of said feet, to provide a pivotal adjustment of said upper base element with respect to said lower base element about an axis passing through said ball bearings.

2. Structure in accordance with claim 1, including means resiliently interconnecting said upper and lower base elements.

3. Structure in accordance with claim 1, including a vertical column supported by said upper base element.

4. Structure in accordance with claim 3, including a clamp element slidably mounted and selectively fixable upon said vertical column.

* * * * *